(12) United States Patent
Friday et al.

(10) Patent No.: US 7,286,833 B2
(45) Date of Patent: Oct. 23, 2007

(54) SELECTIVE TERMINATION OF WIRELESS CONNECTIONS TO REFRESH SIGNAL INFORMATION IN WIRELESS NODE LOCATION INFRASTRUCTURE

(75) Inventors: Robert J. Friday, Los Gatos, CA (US); Alexander H. Hills, Palmer, AK (US)

(73) Assignee: Airespace, Inc., San Jose, CA (US)

( * ) Notice: Subject to any disclaimer, the term of this patent is extended or adjusted under 35 U.S.C. 154(b) by 441 days.

(21) Appl. No.: 10/788,645

(22) Filed: Feb. 27, 2004

(65) Prior Publication Data
US 2005/0197136 A1    Sep. 8, 2005

(51) Int. Cl.
*H04M 1/00*    (2006.01)
(52) U.S. Cl. .................. 455/456.1; 455/456.2; 455/436; 370/331
(58) Field of Classification Search ............ 455/456, 455/342, 357.01
See application file for complete search history.

(56) References Cited

U.S. PATENT DOCUMENTS

| | | | |
|---|---|---|---|
| 4,254,467 A | 3/1981 | Davis et al. | |
| 5,028,848 A | 7/1991 | Bankston et al. | |
| 5,063,371 A * | 11/1991 | Oyer et al. | 340/541 |
| 5,327,144 A | 7/1994 | Stilp et al. | |
| 5,375,140 A | 12/1994 | Bustamante et al. | |
| 5,394,158 A | 2/1995 | Chia | |
| 5,396,582 A | 3/1995 | Kahkoska | |
| 5,564,079 A | 10/1996 | Olsson | |
| 5,570,412 A | 10/1996 | LeBlanc | 455/456.2 |
| 5,666,662 A | 9/1997 | Shibuya | |
| 5,684,860 A | 11/1997 | Milani et al. | |
| 5,717,406 A | 2/1998 | Sanderford et al. | 342/457 |
| 5,732,354 A | 3/1998 | MacDonald | |
| 5,945,948 A | 8/1999 | Buford et al. | |
| 6,112,095 A | 8/2000 | Wax et al. | |

(Continued)

FOREIGN PATENT DOCUMENTS

EP    0 930 514 A2    7/1999

(Continued)

OTHER PUBLICATIONS

"Ekahau Logical Areas-location enabling the Wi-Fi network." Apr. 4, 2003. Ekahau, Inc., Saratoga, CA. Company's URL: www.ekahau.com.

(Continued)

*Primary Examiner*—Lester G. Kincaid
*Assistant Examiner*—Fred A. Casca
(74) *Attorney, Agent, or Firm*—Mark J. Spolyar

(57) ABSTRACT

Methods, apparatuses and systems directed to refreshing signal information in an infrastructure wireless node location mechanism. The wireless node location mechanism selectively terminates connections with wireless clients to refresh signal strength information used to compute an estimated location for the wireless clients. The wireless node location mechanism terminates the connection between a WLAN and a given wireless node, causing in typical WLAN protocol implementations, the mobile station to transmit frames or packets on all available operating channels in a given band. This allows access points and other WLAN elements, operating on different frequency channels, to detect frames transmitted by the mobile station and provide refreshed signal strength information to a wireless node location mechanism.

43 Claims, 4 Drawing Sheets

U.S. PATENT DOCUMENTS

| | | | |
|---|---|---|---|
| 6,115,605 | A | 9/2000 | Siccardo et al. |
| 6,134,338 | A | 10/2000 | Solberg et al. |
| 6,134,448 | A | 10/2000 | Shoji et al. |
| 6,140,964 | A | 10/2000 | Sugiura et al. |
| 6,167,274 | A | 12/2000 | Smith |
| 6,198,935 | B1 | 3/2001 | Saha et al. |
| 6,212,391 | B1 | 4/2001 | Saleh et al. |
| 6,226,400 | B1 | 5/2001 | Doll |
| 6,236,365 | B1 | 5/2001 | LeBlanc et al. |
| 6,243,811 | B1 | 6/2001 | Patel |
| 6,249,252 | B1 | 6/2001 | Dupray |
| 6,269,246 | B1 | 7/2001 | Rao et al. |
| 6,272,541 | B1 | 8/2001 | Cromer et al. |
| 6,275,190 | B1 | 8/2001 | Sugiura et al. |
| 6,282,427 | B1 | 8/2001 | Larsson et al. |
| 6,304,218 | B1 | 10/2001 | Sugiura et al. |
| 6,317,599 | B1 | 11/2001 | Rappaport et al. |
| 6,317,604 | B1 | 11/2001 | Kovach et al. |
| 6,414,634 | B1 | 7/2002 | Tekinay |
| 6,415,155 | B1 | 7/2002 | Koshima et al. |
| 6,441,777 | B1 | 8/2002 | McDonald |
| 6,456,892 | B1 | 9/2002 | Dara-Abrams et al. |
| 6,526,283 | B1 | 2/2003 | Jang |
| 6,556,942 | B1 | 4/2003 | Smith |
| 6,581,000 | B2 | 6/2003 | Hills et al. |
| 6,664,925 | B1 | 12/2003 | Moore et al. |
| 6,674,403 | B2 | 1/2004 | Gray et al. ................. 342/463 |
| 6,704,352 | B1 | 3/2004 | Johnson |
| 6,728,782 | B1 | 4/2004 | D'Souza et al. |
| 6,754,488 | B1 | 6/2004 | Won et al. |
| 6,760,318 | B1 | 7/2004 | Bims |
| 6,766,453 | B1 | 7/2004 | Nessett et al. |
| 6,771,609 | B1 | 8/2004 | Gudat |
| 6,788,658 | B1 | 9/2004 | Bims |
| 6,799,047 | B1 | 9/2004 | Bahl et al. ................ 455/456.1 |
| 6,804,394 | B1 | 10/2004 | Hsu |
| 6,850,946 | B1 | 2/2005 | Rappaport et al. |
| 6,925,070 | B2 | 8/2005 | Proctor, Jr. |
| 6,990,428 | B1 | 1/2006 | Kaiser et al. ................ 702/150 |
| 7,123,924 | B2 | 10/2006 | Cuffaro |
| 2001/0016489 | A1 | 8/2001 | Haymes |
| 2002/0036569 | A1 | 3/2002 | Martin |
| 2002/0045424 | A1* | 4/2002 | Lee ............................ 455/41 |
| 2002/0102988 | A1 | 8/2002 | Myllymaki |
| 2002/0115445 | A1 | 8/2002 | Myllymaki |
| 2002/0118118 | A1 | 8/2002 | Myllymaki et al. |
| 2002/0154134 | A1 | 10/2002 | Matsui |
| 2002/0168958 | A1 | 11/2002 | Ford et al. |
| 2002/0174335 | A1 | 11/2002 | Zhang et al. |
| 2002/0176366 | A1 | 11/2002 | Ayyagari et al. |
| 2002/0188723 | A1 | 12/2002 | Choi |
| 2003/0043073 | A1* | 3/2003 | Gray et al. ................. 342/465 |
| 2003/0098811 | A1 | 5/2003 | Nikolai |
| 2003/0117985 | A1 | 6/2003 | Fujii et al. |
| 2003/0130987 | A1 | 7/2003 | Edlund et al. |
| 2003/0135486 | A1 | 7/2003 | Edlund et al. |
| 2003/0135762 | A1 | 7/2003 | Macaulay |
| 2003/0188006 | A1 | 10/2003 | Bard |
| 2003/0198208 | A1 | 10/2003 | Koos |
| 2004/0022214 | A1 | 2/2004 | Goren |
| 2004/0029559 | A1* | 2/2004 | McNew et al. .......... 455/404.2 |
| 2004/0066757 | A1* | 4/2004 | Molteni et al. ............. 370/329 |
| 2004/0072577 | A1 | 4/2004 | Myllymaki et al. |
| 2004/0111397 | A1 | 6/2004 | Chen et al. |
| 2004/0151377 | A1 | 8/2004 | Boose et al. |
| 2004/0166878 | A1* | 8/2004 | Erskine et al. ........... 455/456.1 |
| 2004/0176108 | A1 | 9/2004 | Misikangas |
| 2004/0186847 | A1 | 9/2004 | Rappaport et al. |
| 2004/0198373 | A1 | 10/2004 | Ford et al. |
| 2004/0198392 | A1* | 10/2004 | Harvey et al. ............ 455/456.1 |
| 2004/0203910 | A1* | 10/2004 | Hind et al. ............... 455/456.1 |
| 2004/0236547 | A1 | 11/2004 | Rappaport et al. |
| 2004/0259554 | A1 | 12/2004 | Rappaport et al. |
| 2004/0259555 | A1 | 12/2004 | Rappaport et al. |
| 2005/0068925 | A1 | 3/2005 | Palm |
| 2005/0113090 | A1 | 5/2005 | Sharony |
| 2005/0128139 | A1 | 6/2005 | Misikangas et al. |
| 2005/0131635 | A1 | 6/2005 | Myllymaki et al. |
| 2005/0136944 | A1 | 6/2005 | Misikangas et al. |
| 2005/0185615 | A1* | 8/2005 | Zegelin ..................... 370/331 |
| 2006/0071854 | A1 | 4/2006 | Wilcox |

FOREIGN PATENT DOCUMENTS

| | | |
|---|---|---|
| EP | 0 967 816 A1 | 12/1999 |
| EP | 1 018 457 A1 | 7/2000 |
| EP | 1 296 531 A1 | 3/2003 |
| EP | 1 301 055 A1 | 4/2003 |
| JP | 02044929 | 2/1990 |
| WO | WO97/33386 | 9/1997 |
| WO | WO98/41048 | 9/1998 |
| WO | WO99/08909 | 2/1999 |
| WO | WO 02/43425 A1 | 5/2002 |
| WO | WO 02/054813 A1 | 7/2002 |
| WO | WO 03/023443 A2 | 3/2003 |

OTHER PUBLICATIONS

"Ekahau Positioning Engine 2.0: Product Overview." Apr. 4, 2003. Ekahau, Inc., Saratoga, CA. URL: http://www.ekahau.com/products/positioningengine/.

"Ekahau Positioning Engine 2.0: Data Sheet." Apr. 4, 2003. Ekahau, Inc., Saratoga, CA. URL: http://www.ekahau.com/pdf/EPE_2.0_datasheet.PDF.

"Indoor Positioning in 802.11b Networks." Apr. 4, 2003. Ekahau, Inc., Saratoga, CA. URL: http://www.ekahau.com/products/positioningengine/features.html.

"InFielder." Apr. 22, 2003. Wireless Valley, Austin, TX. URL: http://www.wirelessvalley.com/Products/InFielder/InFielder.asp.

"LANFielder." Apr. 22, 2003. Wireless Valley, Austin, TX. URL: http://www.wirelessvalley.com/Products/LANFielder/LANFielder.asp.

"Optimatic." Apr. 22, 2003. Wireless Valley, Austin, TX. URL: http://www.wirelessvalley.com/Products/Optimatic/Optimatic.asp.

"Predictor." Apr. 22, 2003. Wireless Valley, Austin, TX. URL: http://www.wirelessvalley.com/Products/Predictor/Predictor.asp.

"LANFielder Product Literature." Feb. 10, 2004. Wireless Valley, Austin, TX. URL: http://www.wirelessvalley.com/Assets/brochures/LanFielder.pdf.

Conley, C.. "Securing WLANS with Location-Enabled Networks." *Wireless Security Perspectives*, vol. 5, No. 3. Mar. 2003. Organization's URL: www.cnp-wireless.com/wsp.html.

"Company Information." Apr. 6, 2004. Corsair Communications: A LightBridge Company, Burlington, MA. Company's URL: www.lightbridge.com.

"Corporate Fact Sheet." Aruba Wireless Networks, San Jose, CA. Feb. 10, 2004. URL: http://www.arubanetworks.com/pdf/corporate_fact_sheet.pdf.

"Airwave Rogue Access Point Detection." 2002. Airwave Wireless, Inc. San Mateo, CA. URL: http://airwave.com/features.html. no month listed.

Geier, J. "Identifying Rogue Access Points." Jan. 6, 2003. Wi-Fi Planet Tutorials. URL: http://www.wi-fiplanet.com/tutorials/article.php/1564431.

Brewin, B. "IBM Develops Tool to Detect Rogue Wireless LAN Access Points." Jun. 17, 2002. Computerworld, Framingham, MA. URL: http://www.computerworld.com/mobiletopics/mobile/story/0,10801,72065,00.html.

Bulusu, N., Heidemann, J., Estrin, D. "GPS-less Low Cost Outdoor Localization for Very Small Devices." *IEEE Personal Communications*, Oct. 2000. URL: http://lecs.cs.ucla.edu/~bulusu/papers/Bulusu00a.pdf.

"AeroScout WLAN Location System." Downloaded on Nov. 10, 2003 from http://www.bluesoft-inc.com/wlan.asp Bluesoft, Inc., San Mateo, CA.

"Cognio Announces Breakthrough Location Technology for WLAN Deployments." Downloaded on Nov. 10, 2003 from http://www.cognio.com/press_detail.asp?itemID=70 Cognio, Inc., Waltham, MA.

"WhereNet Main Page." Downloaded Nov. 10, 2003 from http://www.wherenet.com/ WhereNet, Santa Clara, CA.

Small, J., Smailagic, A., and Siewiorek, D.P. "Determining User Location For Context Aware Computing Through the Use of a Wireless LAN Infrastructure." Institute for Complex Engineered Systems. Carnegie-Mellon University, Pittsburgh, PA, 2000. no month listed Available at http://www-2.cs.cmu.edu/~aura/docdir/small00.pdf.

Kishan, A., Michael, M., Rihan, S., and R. Biswas. "Halibut: An Infrastructure for Wireless LAN Location-Based Services." Technical paper for Course CS444n, Computer Science Department, Stanford University, Stanford CA, Jun. 2001. Previously available at http://fern2.stanford.edu/cs444n/paper.pdf.

Bahl, P. and Padmanabhan, V.N. "RADAR: An In-Building RF-based User Location and Tracking System." IEEE Infocom 2000, vol. 2, Mar. 2000, pp. 775-784.

"Positioning in Wireless Networks Reference." Downloaded on Jul. 28, 2005 from http://binary.engin.brown.edu/. BINARY Group, Division of Engineering, Brown University, Providence, RI. Available online at http://binary.engin.brown.edu/publication/Positioning_Ref.pdf.

Chirumamilla, Mohan K. and Ramamurthy, Byrav. "Agent Based Intrusion Detection and Response System for Wireless LANs." IEEE Int'l Conference on Communications, 2003, vol. 1, pp. 492-496, no month listed.

"IBM Research Demonstrates Industry's First Auditing Tool for Wireless Network Security." Jul. 12, 2001, Hawthorne, N.Y. IBM Research News, Online. URL: http://domino.research.ibm.com/comm/pr.nsf/pages/news.20010712_wireless.html.

"IBM Researchers Demonstrate Industry's First Self-Diagnostic Wireless Security Monitoring Tool." Jun. 21, 2002, Hawthorne, N.Y. IBM NIEUWS, Online! URL: http://domino.research.ibm.com/comm/pr.nsf/pages/news.20020617_dwsa.html.

"Assessing Wireless Security with AiroPeek and AiroPeek NX." A WildPackets Academy Tutorial from www.wildpackets.com, WildPackets Inc., Walnut Creek, CA. Jan. 16, 2003. URL: http://www.wildpackets.com/elements/whitepapers/AiroPeek_Security.pdf.

"AiroPeek and Wireless Security: Identifying and Locating Rogue Access Points." A WildPackets Academy Tutorial from www.wildpackets.com, WildPackets Inc., Walnut Creek, CA. Jan. 16, 2003. URL: http://www.wildpackets.com/elements/whitepapers/RogueAccessPoints.pdf.

Craiger, J. P. "802.11, 802.1x, and Wireless Security." Jun. 23, 2002. From the SANS' Information Security Reading Room on www.sans.org, The SANS Institute, Bethesda, MD. URL: http://www.sans.org/rr/papers/68/171.pdf.

Baily, S. "Is IEEE 802.1X Ready for General Deployment?" Apr. 7, 2002. From the SANS' Information Security Reading Room on www.sans.org, The SANS Institute, Bethesda, MD. URL: http://www.sans.org/rr/papers/9/709.pdf.

"Location Determination Papers", List of publications maintained by Moustafa A. Youssef, Department of Computer Science, University of Maryland, College Park, MD 20742. Available online, and downloaded Feb. 9, 2006 at http://www.cs.umd.edu/~moustafa/location papers.htm.

"Positioning in Wireless Networks Reference" BINARY Group, Division of Engineering, Brown University, Providence, RI 02912, Available online, and downloaded Feb. 9, 2006 as binary.engin.brown.edu/publication/Positioning_Ref.pdf.

L.M. Ni, Y. Liu, Y.C. Lau and A.P. Patil. "LANDMARC: Indoor Location Sensing Using Active RFID." Proceedings of the First IEEE International Conference of Pervasive Computing and Communications 2003 (PerCom '03), no month listed.

G. Wolfle, R. Wahl, P. Wertz, P. Wildbolz and F. Landstorfer. "Dominant Path Prediction Model for Indoor Scenarios." German Microwave Conference (GeMIC) 2005, Ulm (Germany), Apr. 2005 Paper.

P. Wertz, G. Wolfle, R. Hoppe, D. Zimmermann and F.M. Landstorfer. "Enhanced Localization Technique within Urban and Indoor Environments based on Accurate and Fast Propagation Models." European Wireless, 2002, Florence, Italy, no month listed.

Steven Fortune, "Algorithms for prediction of indoor radio propagation", sjf@research.att.com, Jan. 7, 1998, Bell Laboratories, Murray Hill, New Jersey 07974.

A. Rajkumar, B.F. Naylor, F. Feisullin and L. Rogers, "Predicting RF Coverage in Large Environments using Ray-Beam Tracing and Partitioning Tree Represented Geometry", submitted to the ACM Journal of Wireless Networks after revision on Oct. 12, 1995, AT&T Bell Laboratories, Murray Hill, NJ 07974.

Reinaldo A. Valenzuela, Steven Fortune, and Jonathan Ling, "Indoor Propagation Prediction Accuracy and Speed Versus Number of Reflections in Image-Based 3-D Ray-Tracing", 1998, Bell Laboratories, Lucent Technologies, Holmdel, NJ 07733, no month listed.

Bahl, P., Padmanabhan, V. and Balachandran, A. A Software System for Locating Mobile Users: Design, Evaluation and Lessons. Microsoft Research Technical Report MSR-TR-2000-12 [online], Apr. 2000 [retrieved on Jan. 26, 2006]. Retrieved from the Internet: < URL: http://research.microsoft.com/~padmanab/papers/radar.pdf>.

PCT Notification of Transmittal of The International Search Report and The Written Opinion of the International Searching Authority, or the Declaration (PCT Rule 44.1), dated Jan. 11, 2006, International Application No. PCT/US05/06608).

1st Office Action from U.S. Appl. No. 10/802,366, the application which was filed on Mar. 16, 2004, entitled "Location of Wireless Nodes Using Signal Strength Weighting Metric".

2nd Office Action from U.S. Appl. No. 10/802,366, the application which was filed on Mar. 16, 2004, entitled "Location of Wireless Nodes Using Signal Strength Weighting Metric".

Office Action from U.S. Appl. No. 10/794,842, the application which was filed on Mar. 5, 2004, entitled "Selective Termination of Wireless Connections to Refresh Signal Information in Wireless Node Location Infrastructure".

Office Action from U.S. Appl. No. 10/848,276, the application which was filed on May 18, 2004, entitled "Wireless Node Location Mechanism Featuring Definition of Search Region to Optimize Location Computation".

U.S. Appl. No. 10/155,938, Not Published, Calhoun.

U.S. Appl. No. 10/407,584, Not Published, Calhoun.

"tcp-masq" Internet citation *http://speed.cis.nctu.edu.tw/bandwith/opensource/*, Daa Sheet Cisco Aironet 1200 Series Access Point, pp. 1-13, posted Mar. 11, 2002.

International Standard, ISO/IEC 8802-11 ANSI/IEEE Std. 802.11, 1999 Edition, Part II: Wireless LAn Medium Access Control (MAC) and Physical Layer (PHY) specifications, pp. 122-137.

\* cited by examiner

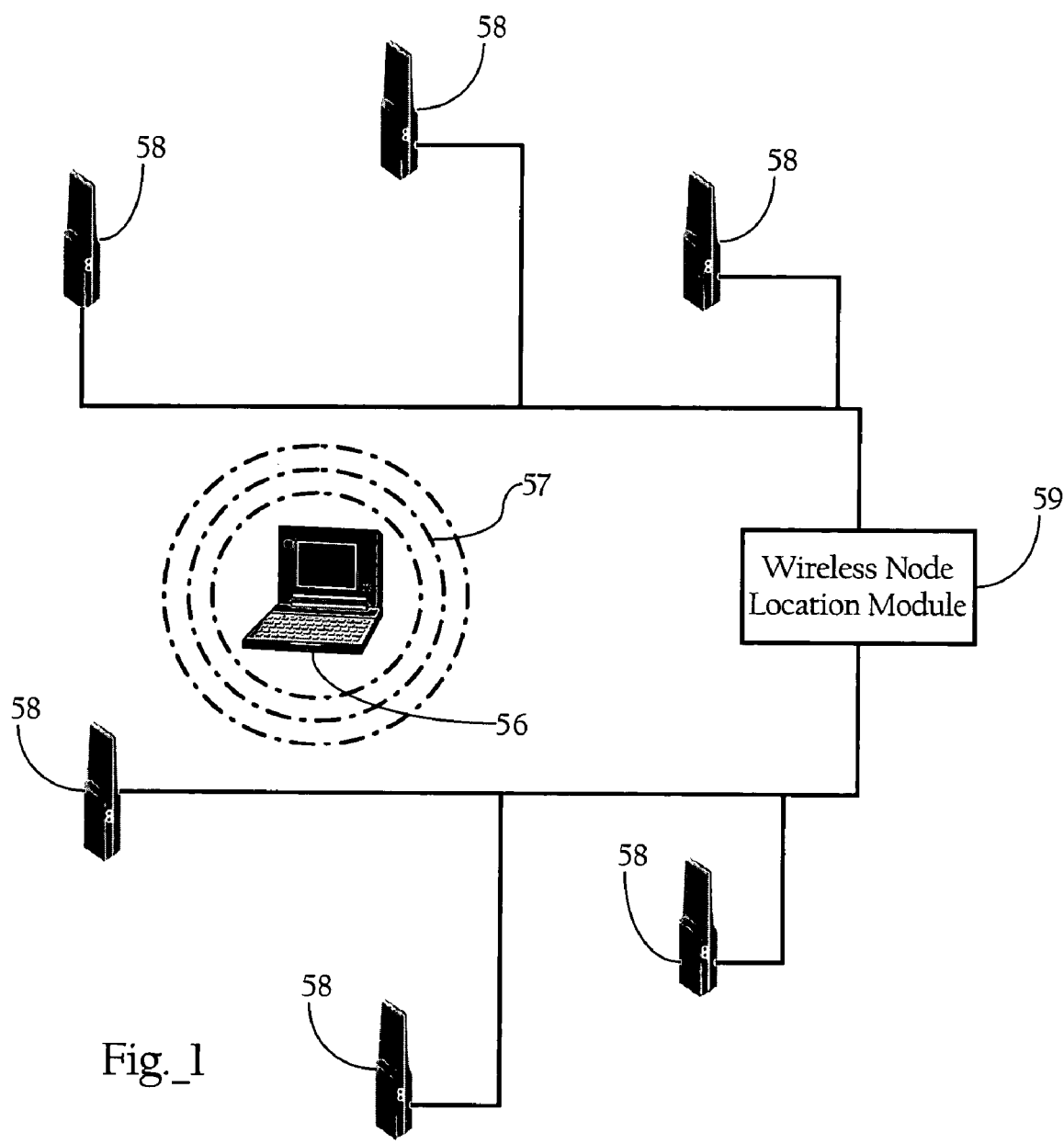
Fig._1

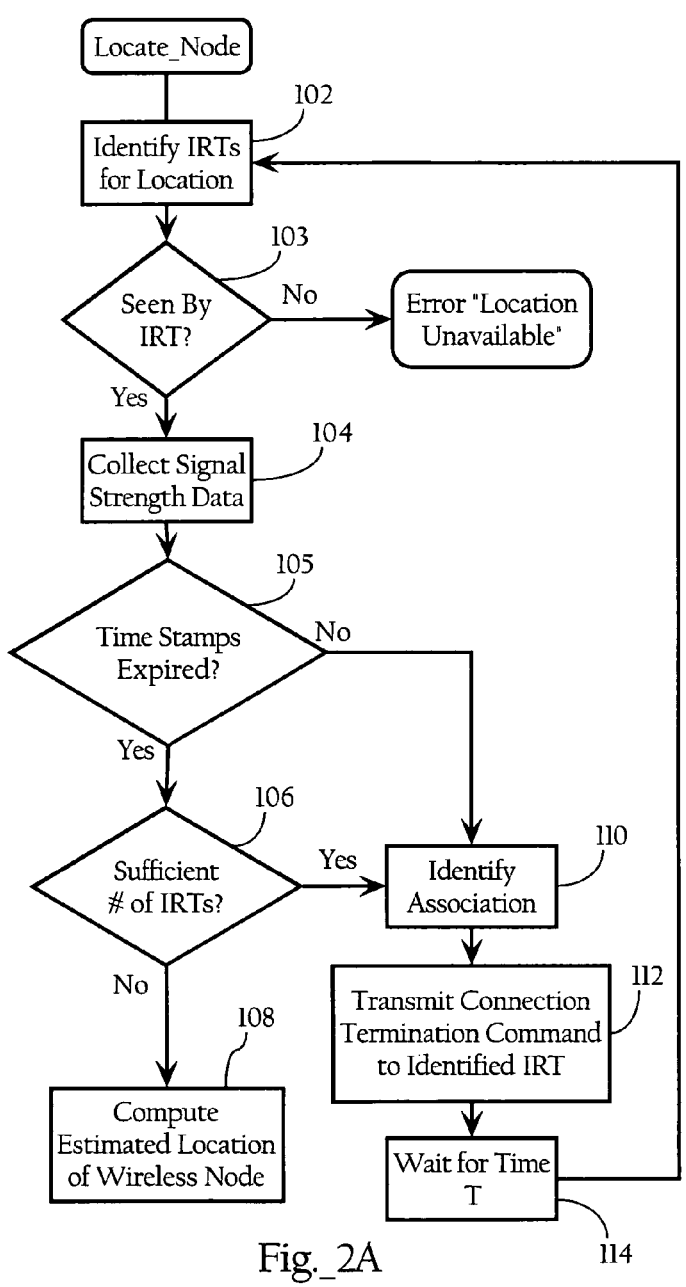
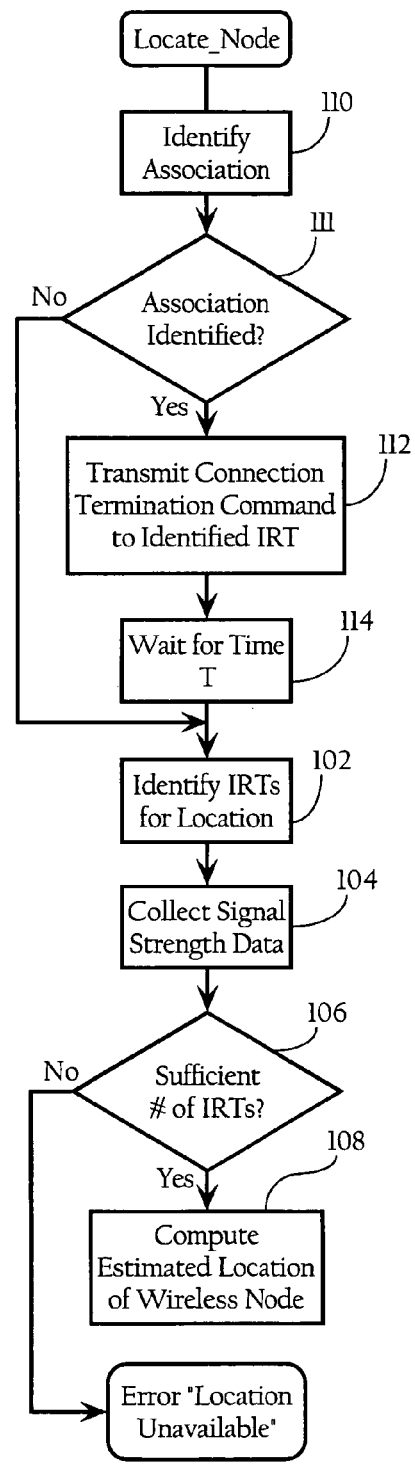
Fig. 2A
Fig. 2B

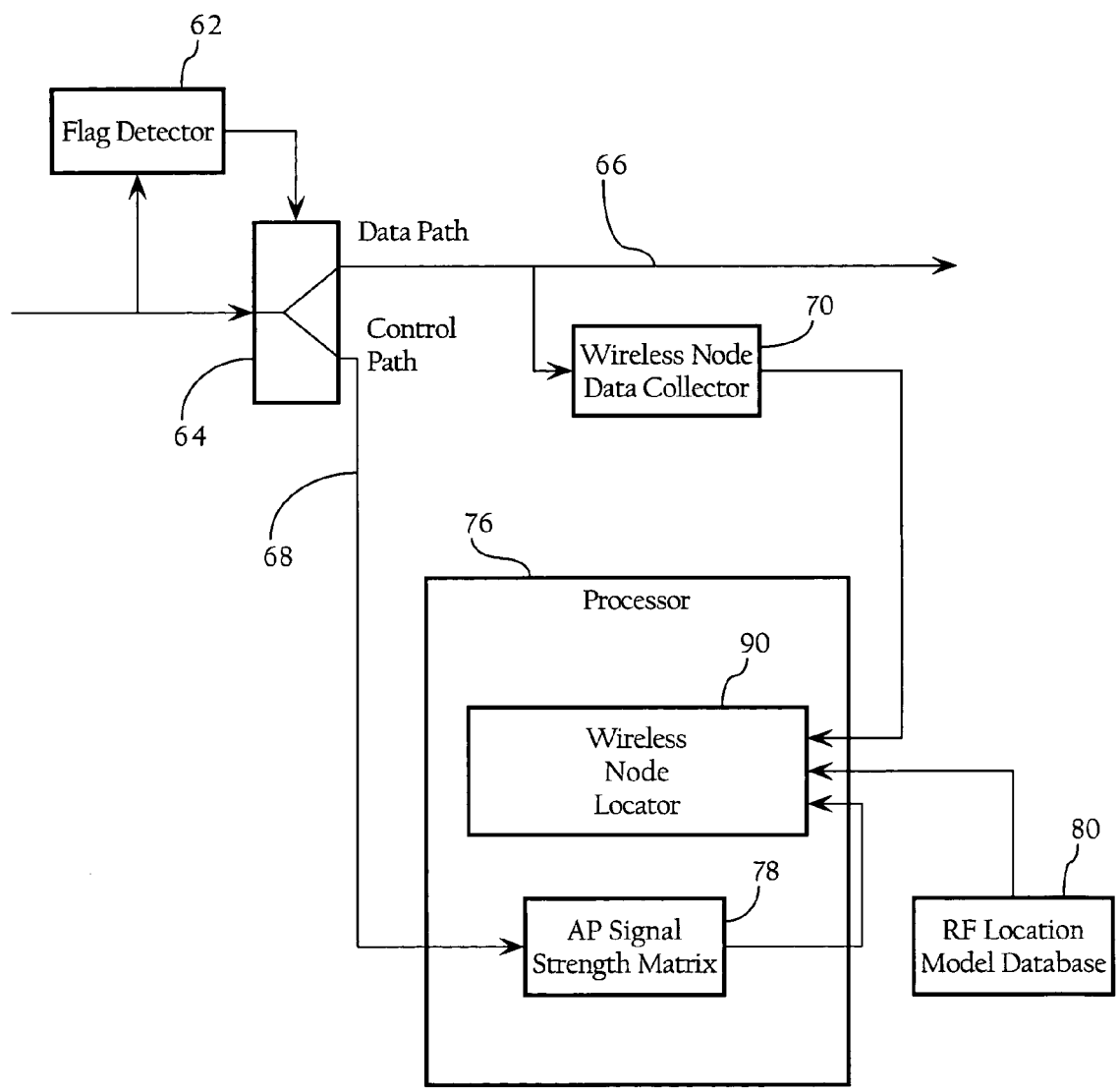
Fig._4

SELECTIVE TERMINATION OF WIRELESS CONNECTIONS TO REFRESH SIGNAL INFORMATION IN WIRELESS NODE LOCATION INFRASTRUCTURE

CROSS-REFERENCE TO RELATED APPLICATIONS

This application makes reference to the following commonly owned U.S. patent applications and/or patents, which are incorporated herein by reference in their entirety for all purposes:

U.S. patent application Ser. No. 10/155,938 in the name of Patrice R. Calhoun, Robert B. O'Hara, Jr. and Robert J. Friday, entitled "Method and System for Hierarchical Processing of Protocol Information in a Wireless LAN;"

U.S. application Ser. No. 10/183,704 in the name of Robert J. Friday, Patrice R. Calhoun, Robert B. O'Hara, Jr., Alexander H. Hills and Paul F. Dietrich, and entitled "Method and System for Dynamically Assigning Channels Across Multiple Radios in a Wireless LAN;"

U.S. patent application Ser. No. 10/407,357 in the name of Patrice R. Calhoun, Robert B. O'Hara, Jr. and Robert J. Friday, entitled "Method and System for Hierarchical Processing of Protocol Information in a Wireless LAN;"

U.S. patent application Ser. No. 10/407,370 in the name of Patrice R. Calhoun, Robert B. O'Hara, Jr. and David A. Frascone, entitled "Wireless Network System Including Integrated Rogue Access Point Detection;"

U.S. application Ser. No. 10/447,735 in the name of Robert B. O'Hara, Jr., Robert J. Friday, Patrice R. Calhoun, and Paul F. Dietrich and entitled "Wireless Network Infrastructure including Wireless Discovery and Communication Mechanism;" and U.S. application Ser. No. 10/611,660 in the name of Paul F. Dietrich, David A. Frascone, Patrice R. Calhoun, Robert J. Friday, Robert B. O'Hara, Jr., and Matthew D. Howard and entitled "Containment of Rogue Systems in Wireless Network Environments."

FIELD OF THE INVENTION

The present invention relates to locating wireless nodes in wireless network environments and, more particularly, to a wireless node location mechanism that selectively terminates connections with wireless clients to refresh signal strength information used to compute estimated locations for the wireless clients.

BACKGROUND OF THE INVENTION

Market adoption of wireless LAN (WLAN) technology has exploded, as users from a wide range of backgrounds and vertical industries have brought this technology into their homes, offices, and increasingly into the public air space. This inflection point has highlighted not only the limitations of earlier-generation systems, but the changing role WLAN technology now plays in people's work and lifestyles, across the globe. Indeed, WLANs are rapidly changing from convenience networks to business-critical networks. Increasingly users are depending on WLANs to improve the timeliness and productivity of their communications and applications, and in doing so, require greater visibility, security, management, and performance from their network.

The rapid proliferation of lightweight, portable computing devices and high-speed WLANs has enabled users to remain connected to various network resources, while roaming throughout a building or other physical location. The mobility afforded by WLANs has generated much interest in applications and services that are a function of a mobile user's physical location. Examples of such applications include: printing a document on the nearest printer, locating a mobile user, displaying a map of the immediate surroundings, and guiding a user inside a building. The required or desired granularity of location information varies from one application to another. Indeed, the accuracy required by an application that selects the nearest network printer, or locates a rogue access point, often requires the ability to determine in what room a mobile station is located. Accordingly, much effort has been dedicated to improving the accuracy of wireless node location mechanisms.

The use of radio signals to estimate the location of a wireless device or node is known. For example, a Global Positioning System (GPS) receiver obtains location information by triangulating its position relative to four satellites that transmit radio signals. The GPS receiver estimates the distance between each satellite based on the time it takes for the radio signals to travel from the satellite to the receiver. Signal propagation time is assessed by determining the time shift required to synchronize the pseudo-random signal transmitted by the satellite and the signal received at the GPS receiver. Although triangulation only requires distance measurements from three points, an additional distance measurement from a fourth satellite is used for error correction.

The distance between a wireless transmitter and a receiver can also be estimated based on the strength of the received signal, or more accurately the observed attenuation of the radio signal. Signal attenuation refers to the weakening of a signal over its path of travel due to various factors like terrain, obstructions and environmental conditions. Generally speaking, the magnitude or power of a radio signal weakens as it travels from its source. The attenuation undergone by an electromagnetic wave in transit between a transmitter and a receiver is referred to as path loss. Path loss may be due to many effects such as free-space loss, refraction, reflection, aperture-medium coupling loss, and absorption.

In business enterprise environments, most location-tracking systems are based on RF triangulation or RF fingerprinting techniques. RF triangulation calculates a mobile user's location based upon the detected signal strength of nearby access points (APs). It naturally assumes that signal strength is a function of proximity in computing the distances between the wireless node and the access points. RF fingerprinting, on the other hand, compares a mobile station's view of the network infrastructure (i.e., the strength of signals transmitted by infrastructure access points) with a database that contains an RF physical model of the coverage area. This database is typically populated by either an extensive site survey or an RF prediction model of the coverage area. For example, Bahl et al., "A Software System for Locating Mobile Users: Design, Evaluation, and Lessons," http://research.microsoft.com/~bahl/Papers/Pdf/radar.pdf, describes an RF location system (the RADAR system) in a WLAN environment, that allows a mobile station to track its own location relative to access points in a WLAN environment.

The RADAR system relies on a so-called Radio Map, which is a database of locations in a building and the signal strength of the beacons emanating from the access points as observed, or estimated, at those locations. For example, an entry in the Radio Map may look like (x, y, z, $ss_i$ (i=1 . . .

n)), where (x, y, z) are the physical coordinates of the location where the signal is recorded, and $ss_i$ is the signal strength of the beacon signal emanating from the ith access point. According to Bahl et al., Radio Maps may be empirically created based on heuristic evaluations of the signals transmitted by the infrastructure radios at various locations, or mathematically created using a mathematical model of indoor RF signal propagation. To locate the position of the mobile user in real-time, the mobile station measures the signal strength of each access point within range. It then searches a Radio Map database against the detected signal strengths to find the location with the best match. Bahl et al. also describe averaging the detected signal strength samples, and using a tracking history-based algorithm, to improve the accuracy of the location estimate. Bahl et al. also address fluctuations in RF signal propagation by using multiple Radio Maps and choosing the Radio Map which best reflects the current RF environment. Specifically, an access point detects beacon packets from other access points and consults a Radio Map to estimate its location, and evaluates the estimated location with the known location. The RADAR system chooses the Radio Map which best characterizes the current RF environment, based on a sliding window average of received signal strengths.

While the RADAR system allows a mobile station to track its location, it does not disclose a system that allows the WLAN infrastructure to track the location of wireless nodes, such as rogue access points. Indeed, the use of a WLAN infrastructure to collect signal strength information corresponding to a mobile station for use in estimating the location of the mobile station does present certain difficulties. The extremely portable nature of mobile stations renders it important to possess sufficiently recent signal strength information for a given mobile station, as it may have moved to a new location after one or more signal strength measurements have been collected by the location infrastructure. In the RADAR system, this is not an issue since the mobile station computes its own location based on beacon packets that access points regularly transmit as part of the normal access point mode defined by the 802.11 protocol. Accordingly, the mobile station can scan all available channels to obtain one or more beacon packets on the channels, and then compute its location based on the newly detected signal strength. In the reverse situation where the WLAN collects signal strength data from wireless nodes, collecting signal strength data can be problematic, since mobile stations ordinarily do not regularly transmit management frames, such as beacon packets, once they associate with an access point. Moreover, adjacent access points in typical WLAN environments operate on non-overlapping channels to exploit the advantages associated with frequency re-use. Accordingly, access points adjacent to the access point to which a given mobile station is associated will not be able to detect RF signals transmitted by the mobile station, unless the adjacent access points go "off channel" to detect the signals transmitted by the mobile station. Switching to an alternate channel to passively or actively scan for a given mobile station interrupts connections with mobile stations associated with an access point. The lack of signal strength information from adjacent access points is especially problematic to wireless node location as signal strength measurements from adjacent access points are typically the most useful in locating a given mobile station. For example, the signal strength information from adjacent access points is typically more accurate as the adjacent access points are generally closer in proximity to the mobile station. Still further, the lack of signal strength information from a sufficient number of access points may prevent the mobile station from being located entirely as location mechanisms require signal strength information from a minimum number of sources.

In light of the foregoing, a need exists in the art for methods, apparatuses and systems directed to refreshing signal strength information in an infrastructure wireless node location mechanism. In addition, a need in the art exists for wireless node location mechanisms that efficiently integrate into WLAN infrastructures. Embodiments of the present invention substantially fulfill these needs.

SUMMARY OF THE INVENTION

The present invention provides methods, apparatuses and systems directed to refreshing signal information in an infrastructure wireless node location mechanism. According to an implementation of the present invention, the wireless node location mechanism selectively terminates connections with wireless clients to refresh signal strength information used to compute an estimated location for the wireless clients. The present invention takes advantage of the characteristics of mobile stations to refresh signal strength information to enhance the accuracy of wireless node location in a WLAN environment. As discussed below, the wireless node location mechanism terminates the connection between a WLAN and a given wireless node, causing in typical WLAN protocol implementations, the mobile station to transmit frames or packets on all available operating channels in a given band. This allows access points and other WLAN elements, operating on different frequency channels, to detect frames transmitted by the mobile station and provide refreshed RF signal information to a wireless node location mechanism.

DESCRIPTION OF THE DRAWINGS

FIG. 1 is a schematic diagram including a wireless node location mechanism according to an implementation of the present invention.

FIG. 2A is a flow chart diagram illustrating the overall process flow directed to the location of a wireless node according to an implementation of the present invention.

FIG. 2B is a flow chart diagram illustrating an overall process flow, according to an alternative implementation of the present invention, directed to locating a wireless node.

FIG. 4 is a functional block diagram highlighting the wireless node location functionality of a central control element in the wireless network system of FIG. 3.

DESCRIPTION OF PREFERRED EMBODIMENT(S)

Figure 3:
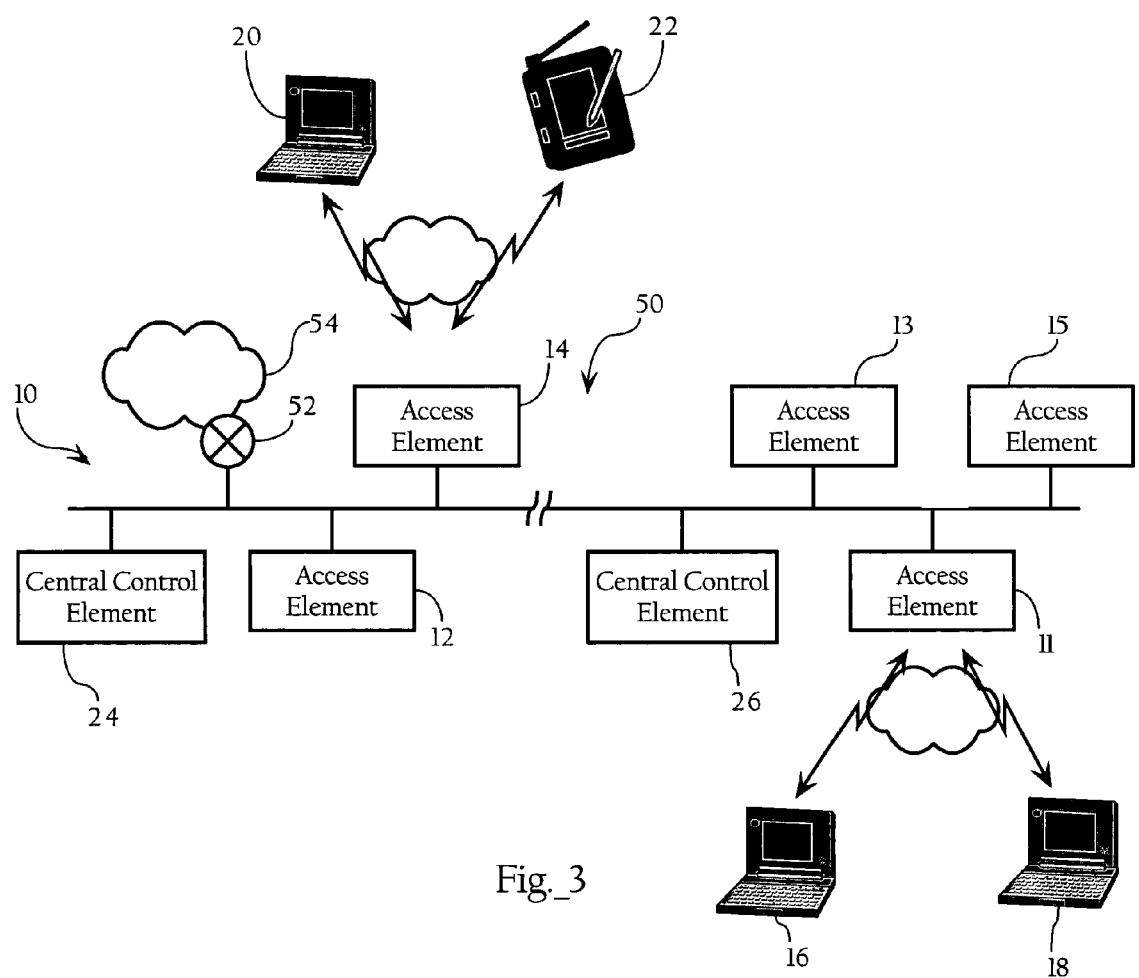
FIG. 3 is a functional block diagram illustrating a wireless network system according to an implementation of the present invention.

A. Wireless Node Location and Forced Termination of Wireless Connections

FIG. 1 illustrates the basic operating components of the wireless node location mechanism according to an implementation of the present invention. As FIG. 1 shows, the wireless node location mechanism includes a wireless node location module 59 and a plurality of infrastructure radio transceivers 58 disposed throughout a physical space. One skilled in the art will recognize that the system depicted in FIG. 1 represents an example of the basic components of the invention and is mostly for didactic purposes. As discussed more fully below, the functionality generally denoted by infrastructure radio transceivers 58 and wireless node location module 59 can be integrated into a variety of systems, such as wireless systems dedicated for location of wireless nodes, or WLAN or other wireless network systems. For didactic purposes, the embodiments described below operate in connection with a WLAN environment according to the IEEE 802.11 WLAN protocol. One skilled in the art will recognize, however, that the present invention can be applied to any suitable wireless network protocol, where mobile stations operate substantially as described herein.

Infrastructure radio transceivers 58 generally comprise at least one antenna, a radio transmit/receive unit, and control logic (e.g., a 802.11 control unit) to control the transmission and reception of radio signals according to a wireless communications protocol. Infrastructure radio transceivers 58, in one implementation, are disposed in known and/or fixed locations throughout a physical space, such as a room, a collection of rooms, a floor of a building, an entire building, or an arbitrarily-defined region, including outside environments, over which infrastructure radio transceivers 58 provide radio-frequency (RF) coverage.

A.1. Infrastructure Radio Transceiver

Infrastructure radio transceivers 58 are operative to detect the strength of received radio-frequency signals, such as the signals 57 transmitted by wireless node 56 and by other radio transceivers, and provide the detected signal strength data for corresponding wireless nodes to wireless node location module 59. In one implementation, infrastructure radio transceivers 58 are also operative to transmit and receive wireless or radio-frequency signals according to a wireless communications protocol, such as the IEEE 802.11 WLAN protocol. Infrastructure radio transceivers 58, in one implementation, can operate on a selected channel from a plurality of channels in a given band. In another implementation, infrastructure radio transceivers 58 can also operate in more than one band. For example, infrastructure radio receivers 58 may be configured to operate in the 802.11a—5 GHz band, the 802.11b/g—2.4 GHz band, or both. In one implementation, infrastructure radio transceivers 58 can be configured to collect the signal strength information associated with wireless nodes and transmit the collected data in response to SNMP or other requests by wireless node location module 59. As discussed below, other methods for collecting signal strength data may also be employed.

Identification of wireless nodes depends on the wireless communications protocol in use. For 802.11 WLAN environments, for example, wireless nodes can be identified based on MAC address. Furthermore, wireless nodes can be authorized mobile stations, such as remote client elements 16, 18 (see FIG. 3), rogue systems (e.g., rogue access points and/or rogue mobile stations), as well as authorized access points for which no location information is known. In other implementations, wireless nodes can be identified based on a unique property of the RF signal, such as a given frequency channel, or a unique signal pattern, and the like. For example, the wireless node location functionality may be employed to locate a detected source of interference, such as a non-802.11 compliant device.

In one implementation, infrastructure radio transceivers 58 are also operable to communicate with one or more mobile stations, such as wireless node 56, according to a wireless communication protocol. For example, each infrastructure radio transceiver 58, in one implementation, is an access point or other WLAN component. In one implementation, radio transceiver 58 is operably connected to a Local Area Network (LAN), Wide Area Network (WAN) or other wireline network to bridge traffic between mobile stations and the wireline network. As discussed more fully below, infrastructure radio transceiver 58 may also be an access element or light weight access point in a wireless network featuring hierarchical processing of protocol information. U.S. patent application Ser. No. 10/155,938, incorporated by reference above, discloses light weight access points in connection with hierarchical processing of wireless protocol information. In one implementation, the radio transceiver 58 implements the 802.11 protocols (where 802.11, as used herein, generically refers to the IEEE 802.11 standard for wireless LANs and all its amendments). Of course, the present invention can be used in connection with any suitable radio-frequency-based wireless network or communications protocol.

For purposes of describing an embodiment of the present invention, infrastructure radio transceivers 58, in one implementation, are wireless access points associated with a wireless LAN based on the IEEE 802.11 standard. When a mobile station, such as wireless node 56, initializes or moves into a new coverage area, according to the 802.11 standard, it transmits probe requests on all operating channels in a given band to locate access points to which it may associate to establish a wireless connection. Mobile stations that are capable of transmitting and receiving radio signals in different bands (e.g., dual band mobile stations) can transmit probe requests on all available channels in all bands. The mobile station scans the available channels in all available bands in the region and listens to Beacon Frames or Probe Response Frames transmitted by access points in that region. Especially in enterprise WLAN systems, the mobile station may often detect multiple access points transmitting in one or more bands. After the mobile station selects a given access point and a band, it sends an authentication frame containing a wireless node identifier (in 802.11 environments, a MAC address associated with the radio Network Interface Controller (NIC) of the mobile station) to the access point. With open system authentication, the mobile station transmits only one authentication frame, and the access point responds with an authentication frame as a response indicating acceptance (or rejection). With shared key authentication, the radio NIC of the mobile station sends an initial authentication frame, and the access point responds with an authentication frame containing challenge text. The mobile station must send an encrypted version of the challenge text (using its Wired Equivalent Privacy (WEP) key) in an authentication frame back to the access point. The access point ensures that the mobile station has the correct WEP key by seeing whether the challenge text recovered after decryption is the same that was sent previously. Based on the results of this comparison, the access point replies to the mobile station with an authentication frame signifying the result of authentication. Other authentication schemes may also be employed, such as 802.1x.

After authentication, the mobile station transmits an association request frame to the access point. 802.11 association enables the access point to allocate resources for and synchronize with the radio network interface controller (NIC) of the mobile station. The association request frame carries information about the radio NIC (e.g., supported data rates) and the Service Set Identifier (SSID) of the network with which it wishes to associate. After receiving the association request, the access point considers associating with the radio NIC, and (if accepted) reserves memory space and establishes an association ID for the radio NIC. An access point sends an association response frame containing an acceptance or rejection notice to the radio NIC requesting association. If the access point accepts the radio NIC, the frame includes information regarding the association, such as association ID and supported data rates. If the outcome of the association is positive, the radio NIC can utilize the access point to communicate with other mobile stations on the network and systems on the distribution (e.g., Ethernet) side of the access point. In one implementation, the access point stores information about the mobile station in an association table, including the MAC address of the mobile station and the association ID. In one implementation, remote devices, such as wireless node location module 59, may access information in the association table via an suitable query method. For example, the draft standard IEEE 802.11k defines a Management Information Base (MIB), that holds the association table which is accessible via SNMP queries. Of course, other proprietary access methods may also be employed.

In one implementation, infrastructure radio transceivers 58 make use of the signal strength detection functionality residing on a wireless network interface adapter. For example, the IEEE 802.11 standard defines a mechanism by which RF energy is measured by the circuitry (e.g., chip set) on a wireless network adapter or interface card. The IEEE 802.11 protocol specifies an optional parameter, the receive signal strength indicator (RSSI). This parameter is a measure by the PHY layer of the energy observed at the antenna used to receive the current packet or frame. RSSI is measured between the beginning of the start frame delimiter (SFD) and the end of the Physical Layer Convergence Procedure (PLCP) header error check (HEC). This numeric value is an integer with an allowable range of 0–255 (a 1-byte value). Typically, 802.11 chip set vendors have chosen not to actually measure 256 different signal levels. Accordingly, each vendor's 802.11-compliant adapter has a specific maximum RSSI value ("RSSI_Max"). Therefore, the RF energy level reported by a particular vendor's wireless network adapter will range between 0 and RSSI_Max. Resolving a given RSSI value reported by a given vendor's chip set to an actual power value (in dBm) can be accomplished by reference to a conversion table. In addition, some wireless networking chip sets actually report received signal strength in dBm units, rather than, or in addition to, RSSI. Other attributes of the signal can also be used in combination with received signal strength or as an alternative. For example, the detected Signal-to-Noise Ratio (SNR) during packet reception can be used in determining overlay signal transmit power. Again, many chip sets include functionality and corresponding APIs to allow for a determination of SNRs associated with packets received from other transceivers 58 and/or wireless node 56. In one implementation, infrastructure radio transceivers 58 stores signal strength data corresponding to the last received frame in an extended association table. In one such implementation, the association table is further extended to include a time stamp indicating the time of the last received frame. Accordingly, the signal strength values and time stamps will be overwritten as new frames are received. In other implementations, this information can be stored in a separate table or other data structure. In another implementation, the association table to support dual-band configuration can further be extended to include an identifier for the band (e.g., 2.4 v. 5 GHz band) on which the frame was received. In addition, as described below, the signal strength information may be collected at another device.

A.2. Wireless Node Location Module

Wireless node location module 59, in one implementation, collects signal strength data received from infrastructure radio transceivers 58 and maintains the signal strength data in association with a wireless node identifier, and an identifier for the infrastructure radio transceiver 58 which provided the signal strength data. In one implementation, the signal strength data may also include the frequency band associated with the channel on which the frame was detected. Wireless node location module 59, in one implementation, is also configured to distinguish between signals received from infrastructure radio transceivers 58 and signals received from other wireless nodes based on the wireless node identifier. In one implementation, wireless node location module 59 maintains a variety of data structures for storing signal strength information. For example, one data structure is used to store the signal strength of signals transmitted between infrastructure radio transceivers 58. In one implementation, wireless node location module 59 stores this inter-IRT signal strength data in a N×N IRT matrix, where N is the number of infrastructure radio transceivers 58. The column entries can correspond to the transmitting transceiver, while the row entries correspond to the receiving transceiver, or vice versa. Various entries in this matrix may be null values as all infrastructure radio transceivers may not, and in most deployments probably will not, be able to detect one another. This inter-IRT signal strength data can be used for a variety of purposes, such as updating one or more parameters associated with the location algorithm, or calibrating signal strength detection across the infrastructure radio transceivers 58.

Wireless node location module 59, in one implementation, maintains signal strength data for all other wireless nodes in tables or other suitable data structures. In one implementation, wireless node location module 59 maintains, for each radio transceiver 58, a separate table including at least two fields: 1) a wireless node identifier; and 2) the detected signal strength. Additional fields may also include: 1) a time stamp indicating the time the radio transceiver 58 received the signal, 2) a channel identifier, and/or 3) a frequency band identifier. In one implementation, when the memory space allocated to the wireless node tables is depleted, the least recently used/updated entry as indicated by the time stamps is overwritten. In one implementation, wireless node location module 59 filters the signal strength data received from the infrastructure radio transceivers 58 against a list of wireless node identifiers in order to identify the appropriate data structure to update. One skilled in the art will recognize that a variety of data structures beyond matrices and tables can be used.

As discussed above, signal strengths are detected, in one implementation, on a frame-by-frame basis. Accordingly, in one embodiment, the signal strength data maintained by wireless node location module 59 can be updated as the frames/packets are received. In one implementation, the latest signal strength value is used to essentially overwrite the old value. In other implementations, however, an average, moving average or weighted moving average can be used if successive wireless frames corresponding to a given wireless node are encountered within a threshold time interval (e.g., typically resulting from a data stream transmission). In such a situation, the time stamp can correspond to the time of the last packet or frame. In addition, while radio transceivers 58 when operating as access points typically operate on different channels, mobile stations at various times (e.g., transmitting probe requests to find access points) transmit wireless frames on all available operating channels. This helps to ensure that a plurality of radio transceivers 58 detect the mobile station. In some implementations, one or more infrastructure radio transceivers 58 that are adjacent to a radio transceiver 58 that detected a given wireless node may be directed to switch to a given operating channel to listen for signals transmitted by the mobile station. Still further, as discussed below, the infrastructure radio transceivers 58 may be commanded to specifically transmit frames on a given channel for the purpose of updating the signal strength data maintained by wireless node location module 59.

Wireless node location module 59, in one implementation, also maintains a RF physical model of the coverage area associated with the RF environment, and uses an RF fingerprinting algorithm to compute the estimated location of a wireless node. As discussed in more detail below, the RF physical model returns an estimated physical location of a wireless node, given the strength of signals detected by the infrastructure radio transceivers 58, as well as an indication of the infrastructure radio transceivers reporting the signal strengths. The RF physical model can be based on any suitable location model that uses signal strength to determine the location of a wireless node. For example, the RF physical model may be based on site survey data, RF prediction computations, or a combination of the two.

In one implementation, the RF physical model characterizes for each infrastructure radio transceiver 58 the received signal strength associated with a wireless transmitter at different locations. For example, in one implementation, the RF physical model comprises a radio coverage map or matrix that indicates the expected signal strength received from a wireless node, given a uniform transmit power, at a given location defined in x-, and y-coordinates. This database can be populated in a variety of ways. For example, the radio coverage maps can be populated with the results of an extensive site survey, according to which a wireless transmitter is placed at different locations in the physical space. During the site survey, the infrastructure radio transceivers 58 operate in a listening mode and report the resulting signal strength of the signal transmitted by the wireless node used to conduct the site survey. In one implementation, the infrastructure radio transceivers 58 can be configured to transmit the signal strength data back to the wireless transmitter, which may be a laptop computer or other wireless device. The coverage maps are constructed by associating the signal strength and location data in the coverage maps corresponding to each infrastructure radio transceiver. The coverage maps may also be constructed by having the WLAN tester (or other wireless node) simply measure the signal strength of frames transmitted by the infrastructure radio transceivers 58 (e.g., beacon packets) at desired locations within the physical location. If path loss symmetry is assumed, this values can be used to construct the coverage maps for each of the infrastructure radio transceivers. To estimate the location of the wireless node, wireless node location module 59 determines the location coordinates, or range of location coordinates, that best fit the coverage maps associated with the infrastructure radio transceivers 58 selected to locate the wireless node based on the detected signal strength data, as discussed in more detail below.

In one implementation, a coverage map, for each infrastructure radio transceiver 58, is maintained that includes the signal strengths in an N×M matrix, where N is the number of x-coordinates in the coverage map, and M is the number of y-coordinates in the coverage map. In one implementation, the extent of the physical space model by the coverage maps for each infrastructure radio transceiver 58 are co-extensive. The coverage maps for all infrastructure radio transceivers 58 can be co-extensive with the physical space in which the location system is deployed, or with a boundary configured by a network administrator. In one implementation, however, knowledge of various antenna attributes associated with each infrastructure radio transceiver 58—such as antenna type (e.g., omni-directional, directional), peak gain orientation, beamwidth, front-to-back isolation—can be used to compress or reduce the size of the coverage maps. In one implementation, the coverage maps can be configured to be substantially co-extensive with the antenna pattern of each antenna connected to the infrastructure radio transceivers 58 out to a threshold signal strength or gain level. For example, the coverage map for a given antenna can be compressed to the front or intended coverage area of the directional antenna. Of course, other data structures can be used such as a table including location coordinates stored in association with tuples of signal strengths and infrastructure radio transceiver antenna identifiers. In addition, if the coverage maps are compressed, the search for the best fit can be isolated to the overlap between coverage maps associated with the antennas selected to locate the wireless node.

In another implementation, the RF physical model may be constructed using an RF prediction model of the coverage area, using mathematical techniques like ray-tracing, and the like. In one implementation, the RF prediction model can be computed for each coordinate location in a desired physical space. The estimated signal strength information for each infrastructure radio transceiver 58 can be used to populate the coverage maps discussed above. In an alternative embodiment, RF prediction models can be computed relative to each infrastructure radio transceiver. If path loss symmetry and transmit power symmetry between the wireless nodes and the infrastructure radio transceivers 58 is assumed, the coverage maps for each infrastructure radio transceiver antenna can be populated by using the computed values at each of the coordinate locations in the coverage map. Of course, site survey data can also be used to adjust one or more parameters associated with the RF prediction model used to estimate expected signal strength at the various locations. As above, the boundaries of the coverage maps can be contoured based on the properties of the antennas connected to the infrastructure radio transceivers 58.

In addition, the location coordinates in the coverage maps can be two-dimensional, x- and y-coordinates, defining location in a horizontal plane. The location coordinates can also be three-dimensional, x-, y- and z-coordinates. Other coordinate systems can be used, such as spherical coordinates or cylindrical coordinates. In addition, the values of the coordinates can be either global (i.e., longitude and latitude) or expressed relative to an arbitrarily-defined origin. In addition, the granularity of the coordinates in the coverage maps depends on the desired granularity of the wireless node location estimates.

Furthermore, wireless node location module 59, in an alternative embodiment, can apply other location algorithms, such as a triangulation algorithm where distances between a given wireless node and three or more infrastructure radio transceivers 58 are computed based on one or more path loss exponents and the signal strengths detected by the infrastructure radio transceivers 58.

Still further, to support dual-band implementations, wireless node location module 59 may maintain location algorithms, such as RF physical models and associated algorithms for more than one band. In another implementation, wireless node location module 59 may maintain different sets of path loss exponents for each radio frequency band. In one implementation, one band may be selected depending on a variety of factors, such as total number of signal strength samples for a given wireless node, whether the total number is above a threshold or minimum required number for estimating location, number of signal strength samples over a given threshold, and the like. In other implementations, all bands can be used to compute an estimated location, assuming a minimum number of samples are detected for each band. In other implementations, signal strengths values across all bands can be used to compute the location of the wireless node.

FIG. 2A illustrates a method, according to one implementation of the present invention, directed to refreshing signal strength information for estimating the location of a wireless node. The wireless node location functionality can be triggered on demand, for example, in response to a command issued by a network administrator using a control interface to locate a mobile station identified by a MAC address or other suitable identifier, such as an arbitrary name associated with a MAC address in a table or other data structure. Wireless node location module 59 may also be triggered automatically in response to the detection of a rogue access point. U.S. application Ser. No. 10/407,370, incorporated by reference above, discloses detection of rogue access points in a wireless network system. Wireless node location module 59 can also be configured to periodically determine the location of a given mobile station in order to track its movement over a period of time.

As FIG. 2A illustrates, wireless node location module 59, in one implementation, begins by identifying the infrastructure radio transceivers (IRTs) 58 whose signal measurements will be used in locating the desired wireless node (102), and collects the signal strength data from the identified IRTs (104). In one implementation, wireless node location module 59 scans the data structures discussed above to identify the infrastructure radio transceivers 58 that see or detect wireless frames transmitted by the desired wireless node. Additional filter criteria can include a threshold signal strength level. If the wireless node has not been seen by any infrastructure radio transceiver 58 (103), wireless node location module 59 reports an error. Otherwise, in the implementation shown, wireless node location module 59 selects the M infrastructure radio transceivers 58 that report the strongest signal strengths in a given band (where M is a configurable parameter). In the implementation shown, wireless node location module 59 then determines whether any of the time stamps associated with the collected signal strength measurements have expired (105). That is, wireless node location module 59, in one implementation, determines whether a sufficient number of infrastructure radio transceivers 58 have been identified (105). For example, wireless node location module 59 uses the time stamps to filter out infrastructure radio transceivers 58 that have not detected the desired wireless node within a threshold period of time. The exact threshold value is not critical to the present invention and may also be a configurable parameter. In one implementation, the threshold time period is 30 seconds. As FIG. 2A illustrates, wireless node location module 59 then determines whether a sufficient number of signal strength values remain for estimating the location of the wireless node (106). Depending on the implementation, this minimum number of samples can be arbitrarily configured by a network administrator or system designer, or be required due to the inherent requirements of the location algorithm. For example, triangulation requires signal strength samples from at least three infrastructure radio transceivers 58. If a sufficient number of samples remain for analysis, wireless node location module 59 computes the estimated location of the wireless node using any suitable wireless node location model or algorithm, such as the algorithms and models discussed above.

Otherwise, wireless node location module 59 attempts to refresh the signal strength information for the wireless node. In implementations, where infrastructure radio transceivers 58 operate as access points, wireless node location module 59, in one implementation, first identifies the infrastructure radio transceiver 58 to which the wireless node has associated (110). Alternatively, if infrastructure radio transceivers are solely dedicated to detecting signals for purposes of location, wireless node location module 59 identifies the access point or other WLAN component to which the wireless node is associated. As discussed above, this can be done by querying the WLAN components using SNMP or other suitable query method. Once the association has been identified, wireless node location module 59 transmits a request to terminate the connection with the wireless node to the access point reporting the association (112). Wireless node location module 59 then waits a configurable time, T, to allow the signal strength data to refresh before attempting to compute the estimated location of the wireless node.

In 802.11 wireless networks, the connection with the wireless node can be terminated in at least two ways. In one implementation, the access point can transmit a deauthentication frame indicating that the access point is terminating the connection. In another implementation, the access point can transmit a disassociation frame that terminates the association. In either case, selectively terminating the connection in this manner, causes the mobile station to scan for access points with which to associate, as well as transmitting probe responses on all available channels in a given band (e.g., 2.4 GHz for 802.11b/g networks, and 5 GHz for 802.11a networks), and for dual-band mobile stations transmitting probe requests on all available channels in a second band. Accordingly, the infrastructure radio transceivers 58 within range of the wireless node will ultimately be able to detect the probe request and its signal strength, regardless of the operating channel (and frequency band) to which they may currently be set. This scheme also allows the adjacent infrastructure radio transceivers 58 to passively detect the wireless node, and ensures that service to other mobile stations is not interrupted as the infrastructure radio transceivers 58 need not go off-channel.

FIG. 2B illustrates an alternative process flow according to an implementation of the present invention. In the process flow of FIG. 2B, wireless node location module 59 first scans the association tables to determine whether the wireless node is associated with an access point (110). If so (111), wireless node location module 59 then terminates the wireless connection as discussed above (112). It then waits for a configurable time, T, for the refreshed signal strength information to propagate through the system (114), and gathers signal strength data (102, 104). As FIG. 2B shows, if no association is identified, in one implementation, it is assumed that the wireless node is a rogue access point or client. Accordingly, wireless node location module 59 proceeds to collecting the signal strength data, if any, and computes the estimated location of the wireless node (108), assuming a sufficient number of signal strength values have been collected.

A variety of embodiments are possible. For example, in an alternative implementation, if the wireless node is a rogue client device (which can be determined by examining the From/To DS bits in the 802.11 frames), wireless node location module 59 could configure the closest radio transceiver 58 to spoof the rogue access point and transmit a deauthentication and/or disassociation frame. U.S. application Ser. No. 10/611,660 discloses the detection of rogue systems and spoofing rogue access points to terminate their connections with rogue clients.

B. Integration into Wireless Network Systems

In one implementation, the wireless node location functionality discussed above can be integrated into a wireless network infrastructure, such as the hierarchical WLAN system illustrated in FIG. 3. For example, the wireless node location functionality described herein may be integrated into a WLAN environment as disclosed in U.S. application Ser. Nos. 10/155,938 and 10/407,357 incorporated by reference herein. The wireless node location functionality according to the present invention, however, may be applied to other wireless network architectures. For example, as discussed above, the wireless node location functionality may be integrated into a wireless network infrastructure including a plurality of substantially autonomous access points that operate in connection with a central network management system.

Referring to FIG. 3, there is shown a block diagram of a wireless Local Area Network system according to an embodiment of the invention. A specific embodiment of the invention includes the following elements: access elements 11–15 for wireless communication with selected client remote elements 16, 18, 20, 22, central control elements 24, 25, 26, and means for communication between the access elements and the central control elements, such as direct line access, an Ethernet network, such as LAN segment 10. As disclosed in U.S. patent application Ser. No. 10/407,357, the access elements, such as access elements 11–15 are directly connected to LAN segment 10 or a virtual local area network (VLAN) for communication with a corresponding central control element 24, 26. See FIG. 3. As disclosed in U.S. patent application Ser. No. 10/155,938, however, access elements 11–15 may also be directly connected to respective central control elements 24, 26 via direct access lines.

The access elements 11–15 are coupled via communication means using a wireless local area network (WLAN) protocol (e.g., IEEE 802.11a or 802.11b, etc.) to the client remote elements 16, 18, 20, 22. As described in U.S. application Ser. Nos. 10/155,938 and 10/407,357, the access elements 12, 14 and the central control element 24 tunnel network traffic associated with corresponding remote client elements 16, 18; 20, 22 via direct access lines or a LAN segment 10. Central control elements 24, 26 are also operative to bridge the network traffic between the remote client elements 16, 18; 20, 22 transmitted through the tunnel with corresponding access elements 11–15. In another implementation, access elements 11–15 may be configured to bridge the network traffic on LAN segments 10, while sending copies of the bridged frames to the access elements for data gathering and network management purposes.

As described in the above-identified patent applications, central control elements 24, 26 operate to perform data link layer management functions, such as authentication and association on behalf of access elements 11–15. For example, the central control elements 24, 26 provide processing to dynamically configure a wireless Local Area Network of a system according to the invention while the access elements 11–15 provide the acknowledgment of communications with the client remote elements 16, 18, 20, 22. The central control elements 24, 26 may, for example, process the wireless LAN management messages passed on from the client remote elements 16, 18; 20, 22 via the access elements 11–15, such as authentication requests and authorization requests, whereas the access elements 11–15 provide immediate acknowledgment of the communication of those messages without conventional processing thereof. Similarly, the central control elements 24, 26 may for example process physical layer information. Still further, the central control elements 24, 26, as discussed more fully below, may for example process information collected at the access elements 11–15 on channel characteristics, signal strength, propagation, and interference or noise.

Central control elements 24, 26, as shown in FIG. 4, may be configured to gather the signal strength data discussed above to support the wireless node location functionality according to the present invention. The signal strength data gathering functionality described herein is quite similar to the data gathering disclosed in U.S. application Ser. No. 10/183,704, incorporated by reference above. In that application, access elements 11–15 append signal strength data to packets received from wireless nodes, typically, in encapsulating headers. The central control elements 24, 26 process the encapsulating packet headers to update various data structures, such as the N×N AP signal strength matrix and wireless node tables discussed above in Section A. U.S. application Ser. No. 10/183,704 discloses the internal operating components and general configuration of access elements 11–15 that can be used in connection with the integrated wireless node location functionality described herein.

FIG. 4 illustrates the logical configuration of central control elements 24, 26, according to an implementation of the present invention. As discussed in U.S. application Ser. No. 10/183,704, in one implementation, there is both a logical data path 66 and a control path 68 between a central control element 24 or 26 and an access element (e.g., access element 11). The control path 68 allows the central control element 24 or 26 to communicate with the radio access elements 11–15 and acquire the signal strength between the radio access elements. By monitoring the data path 66, the central control element 24, 26 can obtain the signal strength of the signals transmitted by other wireless nodes.

More specifically, the wireless node locator 90 in the central control element 24 or 26 collects information from a plurality of access elements via a control channel 68 and a data channel 66. The central control element 24 or 26 receives and transmits data packets and control packets from/to a plurality of access elements 11–15 as described above. A flag detector 62 distinguishes between data packets and control packets, routing them through a logical switch 64 to a high-speed data path 66 in communication with the wired network 15 or to control path 68 within the central control element 24 or 26. The data path 66 is monitored by a wireless node data collector 70. Associated with each data packet is a resource management header which contains RF physical layer information, such as the power in the channel before each received packet, an identifier for the access element receiving the signal, as well as an identifier for the antenna selected to receive the signal. This information, together with the 802.11 protocol information in the native frames, can be used to maintain one or more data structures that maintain signal strength data for the wireless nodes detected by the access elements 11–15, as discussed in section A, above. The control path 68 is coupled to a processor element 76 in which an AP signal strength matrix 78 is maintained. The AP signal strength matrix 78 collects information quantifying the signal strength between access elements 11–15. All of the signal strength data are collected at the access elements 11–15 and communicated over the data path and control path to the central control element 24 or 26, in one implementation, as packetized information in the resource management header in the data path and resource management control packets in the control path, respectively.

As discussed above, in one implementation, the wireless node location function uses signal strength data between access elements to adjust one or more parameters of the wireless node location algorithm, or calibrate the signal strength detection across access elements. To support such an implementation, one task is to create and maintain an AP signal strength matrix for all the remote access elements in the various wireless networks which detect each other's signals. This is accomplished, in one implementation, by having the wireless node locator 90 in the central control element 24 or 26 and a Resource Manager in the access elements 11–15 both passively listen to surrounding access elements and actively probe for surrounding access elements. The wireless node locator in the central control element 24 or 26 can schedule an access element 11–15 in the wireless network to transmit a data measurement request on a specified channel and then record responses from surrounding access elements. The data measurement probe request and the receiver information bandwidth can have a narrower information bandwidth than the normal information bandwidth in order to allow the dynamic range of the receiver to be extended beyond its normal operational range. This allows a radio element to "see" access elements beyond its normal operating range. Scheduling these measurements allows multiple measurements to be made with a single transmission and allows the detection of the transmitting signal to be recognized as a change in amplitude relative to the background noise at the scheduled time, allowing for easier detection of the measurement signal and greater dynamic range. The resulting data can be transmitted in control packets collected by AP signal strength matrix 78 on the control path 68. Passively, for each packet received on the data channel at the access element a measurement of the power in the RF channel is made immediately before the received packet. This interference measurement is sent to the central control element via the data channel by appending a Radio Resource Manager header to the data packet. Alternatively, the access elements may be configured to flag packets received from other access elements such that they are transmitted on the control path 68.

FIG. 4 also illustrates an RF location model database 80 containing data (such as one or more coverage maps associated with the access elements 11–15, the location coordinates of the access elements, path loss exponents, etc.) required by wireless node locator 90 to estimate the location of a wireless node. The association tables, discussed above, can either be maintained by the access elements 11–15 individually, or by the central control elements 24, 26 to which the access elements are connected. When activated, the wireless node locator 90 can operate as discussed above to optionally refresh signal information for one or more wireless nodes, as well as compute the estimated location of a desired wireless node, and return the estimated location to the requesting system, such as a network management system or a control interface. In the WLAN system depicted in FIG. 3, several implementations are possible. For example, central control element 24 may be configured as a "master" central control element for purposes of wireless node location. That is, data collected at all central control elements is ultimately transmitted (either regularly or on demand) from other central control elements (e.g., central control element 26) to the master central control element 24 which controls selective termination of wireless connections, and computes the estimated location of, wireless nodes. Alternatively, the collected data can be transmitted to a network management system that performs the location computations discussed above. Alternatively, central control elements 24, 26 (when deployed in separate physical spaces, such as separate floors or buildings) may operate substantially autonomously.

The invention has been explained with reference to specific embodiments. For example, although the embodiments described above operate in connection with 802.11 networks, the present invention can be used in connection with any wireless network environment. In addition, although the embodiments described above operate in connection with triangulation or RF fingerprinting, any location methodology that relies on signal strength information associated with wireless nodes can be used in the present invention. In addition, although the embodiments described above illustrate a system where a dedicated infrastructure performs the location determination. The invention described above can be implemented by a client application residing on a wireless node, wherein the client application terminates the connection to refresh signal strength information. Other embodiments will be evident to those of ordinary skill in the art. It is therefore not intended that the invention be limited except as indicated by the appended claims.

What is claimed is:

1. In a wireless network environment comprising a plurality of access elements and at least one wireless node, wherein the wireless node is operative to transmit wireless frames on a plurality of operating channels to discover access points with which to connect, a method for refreshing signal information in a wireless node location mechanism, comprising:
   receiving a request to estimate the location of a wireless node connected to a wireless network;
   terminating, responsive to the request to estimate the location, the connection between the wireless node and the wireless network;
   collecting signal strength values, detected at a plurality of radio receivers, corresponding to signals transmitted by the wireless node; and
   computing the estimated location of the wireless node based at least in part on the signal strength values detected by the plurality of radio receivers.

2. The method of claim 1 wherein the computing step comprises
   providing the collected signal strength values to a wireless node location model that returns an estimated location for the wireless node.

3. The method of claim 2 wherein the wireless node location model triangulates the estimated location of the wireless node based on the collected signal strength values and the locations of the plurality of radio receivers.

4. The method of claim 1 wherein the wireless network comprises at least one access point.

5. The method of claim 4 wherein at least one of the radio receivers is an access point in the wireless network.

6. The method M claim 1 wherein at least one of the radio receivers is an access point in the wireless network.

7. The method of claim 1 further comprising wait
   waiting a period of time, after termination of the connection between the wireless network and the wireless node, before computing the estimated location of the wireless node.

8. The method of claim 1 wherein the computing step comprises
  identifying the radio receivers associated with the signal strengths be used in locating the wireless node;
  selecting aspects of an RF physical model associated with the identified radio receivers; and
  computing the estimated location of the wireless node using the signal strengths of the signals detected by the identified radio receivers, and the selected aspects of the physical model.

9. The method of claim 8 wherein the aspects of the RF physical model are coverage maps corresponding to respective radio receivers.

10. The method of claim 9 wherein the coverage maps each comprise a plurality of location coordinates associated with corresponding signal strength values.

11. The method of claim 10 wherein the coverage maps are heuristically constructed.

12. The method of claim 10 wherein the coverage maps are based on a mathematical model.

13. The method of claim 1 wherein the wireless node implements the 802.11 protocol.

14. The method of claim 1 wherein the at least one wireless node and the radio receivers are capable of operating in more than one radio frequency band, and wherein the location of the wireless node is computed based on the signal strength values detected by the radio receivers and the radio frequency band associated with the signal strength values.

15. The method of claim 14 wherein the computing step comprises
  identifying the radio receivers associated with the signal strengths to be used in locating the wireless node;
  selecting aspects of an RF physical model associated with the identified radio receivers and the radio frequency band an which the signal strengths were detected by the radio receivers; and
  computing the estimated location of the wireless node using the signal strengths of the signals detected by the identified radio receivers, and the selected aspects of the physical model.

16. The method of claim 15 wherein the aspects of the RF physical model are coverage maps corresponding to respective radio receivers.

17. The method of claim 16 Therein the coverage maps each comprise a plurality of location coordinates associated with corresponding signal strength values.

18. The method of claim 17 wherein the coverage maps are heuristically constructed.

19. The method of claim 17 wherein the coverage maps are based on a mathematical model.

20. In wireless network environment comprising a plurality of access elements and at least one wireless node, wherein the wireless node is operative to transmit wireless frames on a plurality of operating channels to discover access points with which to connect, wherein the access elements are operative to transmit responses to the wireless node, a method for refreshing signal information in a wireless node location mechanism, comprising:
  receiving a request to estimate the location of a wireless node connected to a wireless network;
  terminating, responsive to the request to estimate the location, the connection between the wireless node and the wireless network;
  collecting signal strength values of signals transmitted between a plurality of radio receivers and the wireless node; and
  computing the estimated location of the wireless node based at least in part on the collected signal strength values.

21. The method of claim 20 wherein the collecting step is performed at the wireless node.

22. The method of claim 20 wherein signal strength values are measured at the access elements.

23. The method of claim 20 wherein the computing step comprises
  providing the collected signal strength values to a wireless node location model that returns an estimated location for the wireless node.

24. The method of claim 23 wherein the wireless node location model triangulates the estimated location of the wireless node based on the collected signal strength values and the locations of the plurality of radio receivers.

25. The method of claim 20 wherein the wireless network comprises at least one access point.

26. The method of claim 20 further comprising
  waiting a period of time, after termination of the connection between the wireless network and the wireless node, before computing the estimated location of the wireless node.

27. The method of claim 20 Therein the computing step comprises
  identifying the radio receivers associated with the signal strengths to be used in locating the wireless node;
  selecting aspects of an RF physical model associated with the identified radio receivers; and
  computing the estimated location of the wireless node using the signal strengths of the signals detected by the identified radio receivers, and the selected aspects of the physical model.

28. The method of claim 27 wherein the aspects of the RF physical model are coverage maps corresponding to respective radio receivers.

29. The method of clam 28 wherein the coverage maps each comprise a plurality of location coordinates associated with corresponding signal strength values.

30. The method of claim 29 wherein the coverage maps are heuristically constructed.

31. The method of claim 29 wherein the coverage maps are based on a mathematical model.

32. The method of claim 20 wherein the wireless node implements the 802.11 protocol.

33. An apparatus facilitating the location of a wireless node connected to a wireless network, Wherein the wireless node is operative to transmit wireless frames on a plurality of operating channels to discover access points with which to connect, comprising:
  a plurality of radio receivers comprising at least one antenna, the plurality of radio receivers operative to detect the strength of signals transmitted by wireless nodes and provide the detected signal strengths to a wireless node location module; and
  a wireless node location module operative to:
    selectively terminate, in response to a request to estimate a location of the wireless node, the connection between the wireless node and the wireless network;
    collect signal strength values, detected at a plurality of radio receivers, corresponding to signals transmitted by the wireless node; and
    compute the estimated location of the wireless node based at least in part on the signal strength values detected by the plurality of radio receivers.

34. The apparatus of claim 33 wherein the wireless node location module is further operative to wait a period of time, after termination of the connection between the wireless node and the wireless network, before computing the estimated location of the wireless node.

35. An apparatus facilitating location of a wireless node connected to a wireless network, wherein the wireless node is operative to transmit wireless frames on a plurality of operating channels to discover access points with which to connect, comprising:
 a communication module operative to interact with a plurality of radio receivers comprising at least one antenna, the plurality of radio receivers operative to detect the strength of signals transmitted by wireless nodes and provide the detected signal strengths to a wireless node location, module; and
 a wireless node location module operative to:
  selectively terminate, response to a request to estimate location of the wireless node, the connection between the wireless node and the wireless network;
  collect signal strength values, detected at a plurality of radio receivers, corresponding to signals transmitted by the wireless node; and
  compute the estimated location of the wireless node based at least in part on the signal strength values detected by the plurality of radio receivers.

36. The apparatus of claim 35 wherein the communication module comprises a network interface adapter.

37. A wireless network system facilitating the location of a wireless node, wherein the wireless node is operative to transmit wireless frames on a plurality of operating channels to discover access points with which to connect, comprising:
 a plurality of access elements for wireless communication with at least one remote client element and for communication with a central control element; wherein a RF coverage map, corresponding to each of the access elements, characterizes the signal strength values for locations in a physical region,
 wherein the access elements are each operative to:
  establish and maintain, in connection with a central control element, wireless connections with remote client elements;
  detect the strength of received signals;
  append a signal strength value to frames received from wireless nodes; and
  transmit received frames to a central control element;
 at least one central control element for supervising the access elements, wherein the central control element is operative to:
  manage wireless connections between the access elements and corresponding remote client elements, and
  store signal strength data appended to frames transmitted by the plurality of access elements in association with wireless node identifiers; and a wireless node location module operative to
  selectively terminate, in response to a request to estimate a location of the wireless node, the connection between a wireless node and an access element;
  compute the estimated location of the wireless node based at least in part on the signal strength values detected by the plurality a access elements.

38. The system of claim 37 wherein the wireless node location module is further operative to wait a period of time, after termination of the connection between the wireless node and the access element, before computing the estimated location of the wireless node.

39. The system of claim 37 wherein the wireless node location module resides in a network management system.

40. The system of claim 37 wherein the wireless node location module resides in the central control element.

41. The system of claim 37 wherein the wireless node location module maintains a signal strength matrix including values representing the strength of signals detected between the access elements.

42. The system of claim 37 wherein the frames are 802.11 frames.

43. The system of claim 38 wherein the wireless node identifiers are MAC addresses.

* * * * *